United States Patent
Oh et al.

(10) Patent No.: US 9,645,302 B2
(45) Date of Patent: May 9, 2017

(54) BACKLIGHT UNIT AND DISPLAY DEVICE INCLUDING THE SAME

(71) Applicant: LG Display Co., Ltd., Seoul (KR)

(72) Inventors: Seok-Hwan Oh, Gumi-si (KR); Young-Min Kweon, Paju-si (KR); Du-Ho Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/536,466

(22) Filed: Nov. 7, 2014

(65) Prior Publication Data

US 2015/0131028 A1 May 14, 2015

(30) Foreign Application Priority Data

Nov. 11, 2013 (KR) .......................... 10-2013-0136297

(51) Int. Cl.
*G02F 1/1333* (2006.01)
*G02F 1/1335* (2006.01)
*F21V 8/00* (2006.01)

(52) U.S. Cl.
CPC ............ *G02B 6/005* (2013.01); *G02B 6/0055* (2013.01); *G02B 6/0085* (2013.01); *G02F 1/133615* (2013.01); *G02F 2001/133614* (2013.01)

(58) Field of Classification Search
CPC ... G02F 1/133621; G02F 2001/133614; G02B 6/005; G02B 6/0055; G02B 6/0085
See application file for complete search history.

(56) References Cited

U.S. PATENT DOCUMENTS

| 4,248,947 A * | 2/1981 | Oikawa ................. H01J 9/2271 430/23 |
| 5,963,280 A * | 10/1999 | Okuda ................. G01C 21/365 349/64 |
| 7,036,946 B1 * | 5/2006 | Mosier .............. G02F 1/133617 349/68 |
| 8,324,640 B2 | 12/2012 | Jacob et al. |
| 2006/0001036 A1 | 1/2006 | Jacob et al. |
| 2006/0268537 A1 | 11/2006 | Kurihara et al. |
| 2009/0080215 A1 * | 3/2009 | Anandan .............. G02B 6/0036 362/606 |
| 2010/0027293 A1 | 2/2010 | Li |
| 2010/0039796 A1 * | 2/2010 | Mukawa .............. G02B 6/0033 362/97.1 |

(Continued)

FOREIGN PATENT DOCUMENTS

| CN | 101846849 A | 9/2010 |
| CN | 201866642 U | 6/2011 |

(Continued)

OTHER PUBLICATIONS

European Patent Office, Search Report and Opinion, European Patent Application No. 14189678.7, Apr. 9, 2015, six pages.

(Continued)

*Primary Examiner* — Donald Raleigh
(74) *Attorney, Agent, or Firm* — Fenwick & West LLP

(57) ABSTRACT

A backlight unit includes a light source providing a blue light; a light guide plate of glass at a side of the light source; an optical sheet on the light guide plate; a reflective sheet under the light guide plate; and an optic change part including a yellow fluorescent material, wherein the blue light is changed into a white light by the optical change part.

6 Claims, 13 Drawing Sheets

(56) References Cited

U.S. PATENT DOCUMENTS

| | | | |
|---|---|---|---|
| 2010/0214788 A1* | 8/2010 | Kadono | C03C 17/006 362/311.01 |
| 2011/0128756 A1* | 6/2011 | Cho | G02B 6/0068 362/606 |
| 2012/0138874 A1* | 6/2012 | Yuan | C09K 11/02 252/582 |
| 2012/0212931 A1* | 8/2012 | Kinoshita | F21K 9/52 362/84 |
| 2013/0193837 A1* | 8/2013 | Ohno | B32B 15/00 313/498 |
| 2013/0335677 A1* | 12/2013 | You | G02F 1/133609 349/65 |
| 2014/0036205 A1* | 2/2014 | Sugiura | H01L 25/0753 349/69 |
| 2014/0169033 A1* | 6/2014 | Yu | H05K 7/20409 362/611 |
| 2014/0204275 A1 | 7/2014 | Shimizu | |
| 2015/0241621 A1* | 8/2015 | Inui | G02F 1/133615 349/65 |

FOREIGN PATENT DOCUMENTS

| | | |
|---|---|---|
| CN | 103148406 A | 6/2013 |
| JP | H07-176794 A | 7/1995 |
| KR | 10-2010-0127578 A | 12/2010 |
| WO | WO 2012/017613 A1 | 2/2012 |
| WO | WO 2012/099001 A1 | 7/2012 |
| WO | WO 2013/024712 A1 | 2/2013 |
| WO | WO 2014050729 A1 * | 4/2014 ....... G02F 1/133615 |

OTHER PUBLICATIONS

Korean Office Action, Korean Application No. 10-2013-0136297, Mar. 7, 2016, 6 pages (with concise explanation of relevance).

State Intellectual Property Office of the People's Republic of China, First Office Action, Chinese Patent Application No. 201410643467.8, Jan. 26, 2017, twenty-four pages.

* cited by examiner

… (1)

BACKLIGHT UNIT AND DISPLAY DEVICE INCLUDING THE SAME

CROSS-REFERENCE TO RELATED APPLICATION

The present application claims the benefit of Korean Patent Application No. 10-2013-0136297 filed in Korea on Nov. 11, 2013, which is hereby incorporated by reference in its entirety.

BACKGROUND

Field of the Disclosure

The present disclosure relates to a display device, and more particularly to a backlight unit and a display device including the backlight unit.

Discussion of the Related Art

A related art LCD device uses optical anisotropy and polarization properties of liquid crystal molecules. The transmissivity of the liquid crystal molecules is changed by an electric field such that the LCD device displays images.

As shown in FIG. 1, which is a schematic cross-sectional view of the related art LCD device, the LCD device includes a liquid crystal panel 10, a backlight unit 20, a bottom frame 30, a main frame 40, and a top frame 50.

The liquid crystal panel 10 includes a thin film transistor (TFT) substrate 12, a color filter substrate 14 facing the TFT substrate, and a liquid crystal layer (not shown) therebetween.

First and second polarizing plates 16 and 18 are attached on lower and upper sides of the liquid crystal panel 10.

The backlight unit 20 includes a reflective sheet 21, a light source 23, a light guide plate 25, an optical sheet 27, and a housing 29 supporting the light source 23.

The reflective sheet 21 reflects the light leaked from the light guide plate 25 toward the liquid crystal panel 10.

The light source 23 includes a printed circuit board (PCB) 23a and a light emitting diode (LED) 23b. An external voltage is supplied to an LED package by the PCB 23a.

The light guide plate 25 provides the light from the light source 23 into the liquid crystal panel 10. The light guide plate 25 may be formed of poly methyl methacrylate (PMMA) or glass.

The light from the light guide plate 25 is diffused and concentrated by the optical sheet 27 and is provided onto the liquid crystal panel 10.

The bottom frame 30 has a space for the light source 23, the reflective sheet 21, the light guide plate 25 and the optical sheet 27. In addition, the bottom frame 30 supports the main frame 40.

The main frame 40 supports the liquid crystal panel 10. The main frame 40 may include a panel supporting part for supporting the liquid crystal panel 10 and a side wall covering the backlight unit 20.

The top frame 50 covers front edges of the liquid crystal panel 10 and a side of the main frame 40 and the bottom frame 30.

In the related art LCD device, the light source 23 includes the LED package, and the light guide plate 25 includes glass.

Due to the properties of the material of the light guide plate 25, a difference in the color coordinate and the color sense between a first side of the light guide plate 25, which faces the light source 23, and a second side of the light guide plate 25, which opposite to the first side, is generated. As a result, the image quality of the LCD device is degraded.

SUMMARY

Accordingly, the present disclosure is directed to a backlight unit and a display device including the same that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the present disclosure provides a backlight unit including a light source providing a blue light; a light guide plate of glass at a side of the light source; an optical sheet on the light guide plate; a reflective sheet under the light guide plate; and an optic change part including a yellow fluorescent material, wherein the blue light is changed into a white light by the optical change part.

In another aspect, the present invention provides a display device including a liquid crystal panel; and a backlight unit disposed under the liquid crystal panel and providing a light to the liquid crystal panel, the backlight unit including: a light source providing a blue light; a light guide plate of glass at a side of the light source; an optical sheet on the light guide plate; a reflective sheet under the light guide plate; and an optic change part including a yellow fluorescent material, wherein the blue light is changed into a white light by the optical change part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the embodiments of the present disclosure, examples of which are illustrated in the accompanying drawings.

Figure 1:
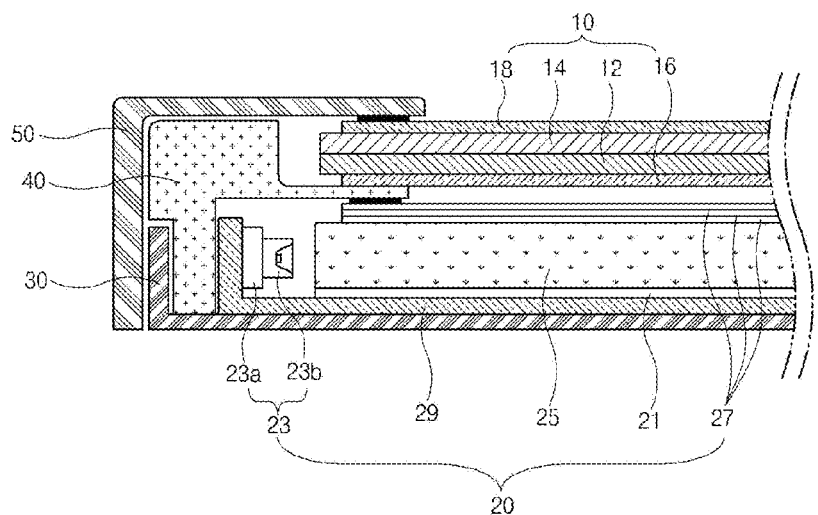
FIG. 1 is a schematic cross-sectional view of a related art LCD device.
Figure 2:
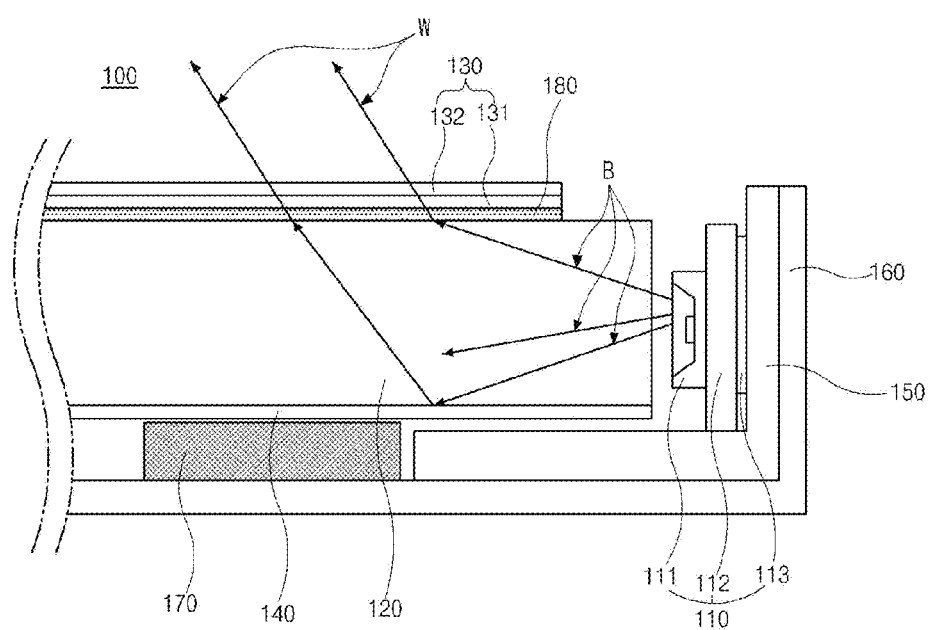
FIG. 2 is a schematic cross-sectional view of a backlight unit, according to one embodiment.
Figure 3:
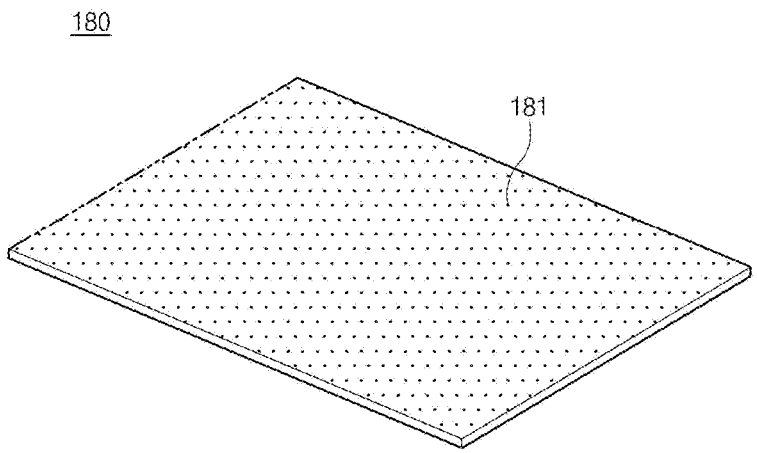
FIG. 3 is a perspective view of an optic change part, according to one embodiment.
Figure 4A:
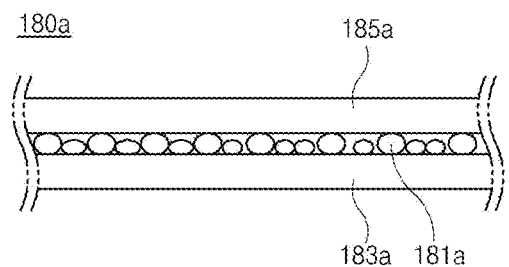
FIGS. 4A and 4B are cross-sectional views of modified optic change part, according to one embodiment.
Figure 4B:
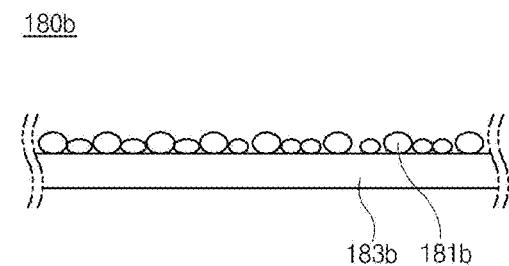

FIG. 2 is a schematic cross-sectional view of a backlight unit according to one embodiment, and FIG. 3 is a perspective view of one embodiment of an optic change part. FIGS. 4A and 4B are cross-sectional views of modified optic change part.

As shown in FIG. 2, the backlight unit 100 includes a light source 110 providing a blue light B, a light guide plate 120, an optical sheet 130, a reflective sheet 140, a housing 150, a bottom frame 160, a supporting part 170 and an optic change part 180.

The light source 110 includes a blue LED array 111, a PCB 112 and a heat-radiating part 113.

In more detail, the blue LED array 111 emitting the blue light B is arranged on a first surface of the PCB 112. The blue LED array 111 receives a power from an outer part through the PCB 112.

The heat-radiating part 113 is coupled to a second surface of the PCB 112. The heat from the blue LED array 111 is radiated into an outer space by the heat-radiating part 113. Since the heat from the blue LED array 111 is radiated into the housing 150, increase of a temperature in the backlight unit 120 can be prevented. As a result, thermal deformation of the light guide plate 120 by the heat from the blue LED array 111 is also prevented.

The light guide plate 120 is disposed at a side of the light source 110, and the light B from the blue LED array 111 is provided through an upper surface of the light guide plate 120. In other words, the light source 110 is positioned at a side of the light guide plate 120.

The light guide plate 120 is formed of a material having light transmittance above about 90%. In one embodiment, the light guide plate 120 is formed of PMMA or glass, and beneficially glass having a relatively smaller expansion rate with respect to moisture or temperature. For example, the light guide plate 120 may be formed of soda lime glass, borosilicate glass or quartz glass.

The optical sheet 130 is disposed over the upper surface of the light guide plate 120. The light is diffused and concentrated by the optical sheet 130. For example, the optical sheet 130 includes a light-diffusion sheet 131 and a light-concentration sheet 132.

The optic change part 180 is positioned between the light guide plate 120 and the optical sheet 130. Referring to FIG. 3, the optic change part 180 includes a yellow fluorescent material 181. The yellow fluorescent material 181 may be a mixture of a green fluorescent material and a red fluorescent material. Alternatively, the yellow fluorescent material 181 may be a single yellow fluorescent material. The optic change part 180 serves as an optical sheet as well as a changing layer of the color of the light.

For example, as shown in FIG. 4A, one embodiment of the optic change part 180a may include a base layer 183a, a cover layer 185a and the yellow fluorescent material 181a therebetween.

Each of the base layer 183a and the cover layer 185a may be formed of one of polycarbonate (PC), PMMA, polystyrene (PS), a co-polymer of PS and PMMA and glass. The base layer 183a is formed of the same material as or a different material from the cover layer 185a.

As shown in FIG. 4B, another embodiment of the optic change part 180b may include a base layer 183b and the yellow fluorescent material 181b coated on the base layer 183b. The base layer 183b may be formed of one of polycarbonate (PC), PMMA, polystyrene (PS), a co-polymer of PS and PMMA and glass.

After the blue light B from the blue LED array 111 passes through the light guide plate 120 of glass, the blue light B is incident onto the optic change part 180 to be a white light W by the yellow fluorescent material 181 in the optic change part 180.

The light-diffusion sheet 131 diffuses the white light W and controls a direction of the white light W into the light-concentration sheet 132.

The light-concentration sheet 132 may include a prism pattern (not shown), and the white light W through the light-diffusion sheet 131 is concentrated into the liquid crystal panel (not shown) by the light-concentration sheet 132.

In FIG. 2, the light-concentration sheet 132 is disposed on the light-diffusion sheet 131. Alternatively, the light-diffusion sheet 131 may be disposed on the light-concentration sheet 132.

In FIG. 2, the optic change part 180 is disposed between the optical sheet 130 and the light guide plate 120. Alternatively, the optical change part 180 may be disposed on the optical sheet 130 or between the light-diffusion sheet 131 and the light-concentration sheet 132.

The reflective sheet 140 reflects the blue light B leaked from the light guide plate 120 toward the liquid crystal panel (not shown).

The housing 150 includes a relatively high thermal conductivity material. For example, the housing 150 may include aluminum (Al).

The housing 150 includes an inner side surface, where the light source 110 is attached, and a horizontal bottom surface, which is vertically bent from the side surface, under the reflective sheet 140.

The bottom frame 160 includes side surfaces and a horizontal bottom surface to provide a space for the light source 110, the light guide plate 120, the optical sheet 130, the reflective sheet 140 and the optic change part 180.

Since the bottom frame 160 is attached to the side surface of the housing 150, the heat from the blue LED array 111 is radiated into an outer space through the heat-radiation part 113, the housing 150 and the bottom frame 160.

The supporting part 170 is positioned between the horizontal bottom surface of the bottom frame 160 and the reflective sheet 140 to support the reflective sheet 140 and the light guide plate 120.

Since the light guide plate 120 is formed of glass and the reflective sheet 140 is formed of polycarbonate-based material, the supporting part 170 is formed of an elastic material, e.g., silicon, rubber, polyethylene terephthalate (PET) or polycarbonate.

Figure 5A:
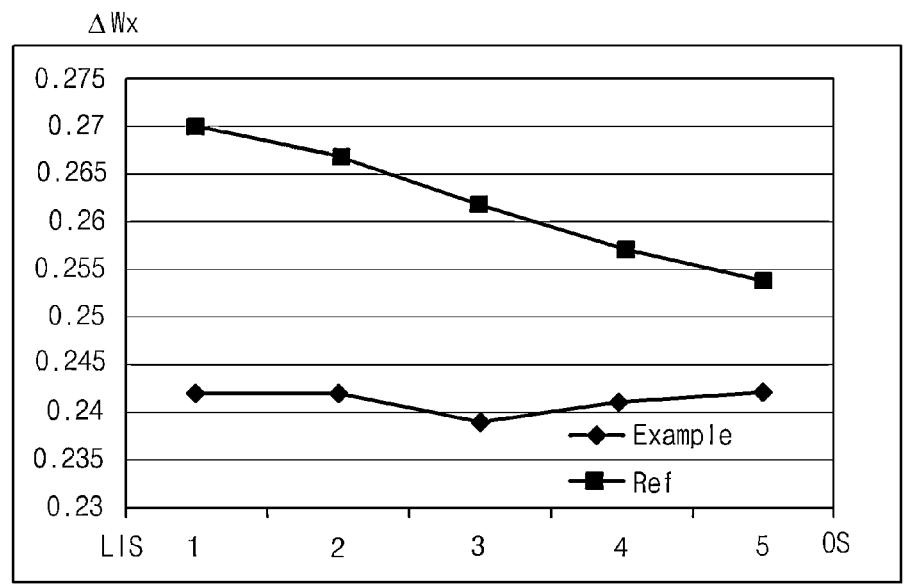
FIGS. 5A to 5C are graphs illustrating optical properties in backlight units.
Figure 5B:
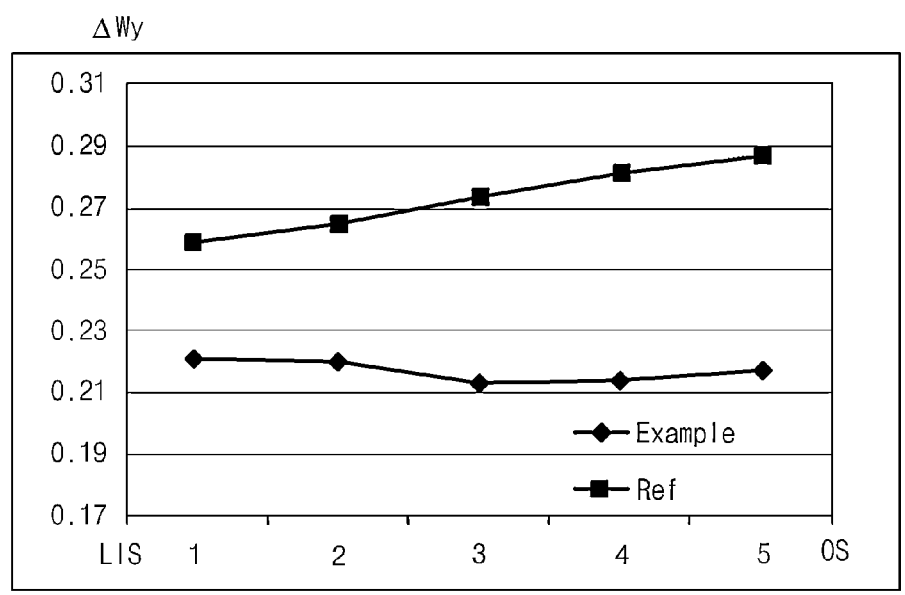
Figure 5C:
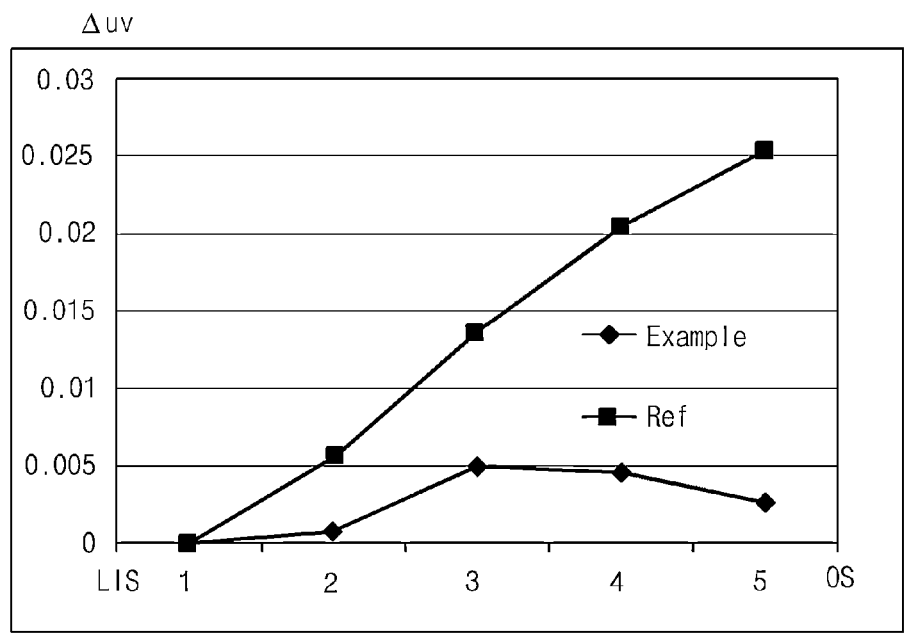

FIGS. 5A to 5C are graphs illustrating optical properties in backlight units. The backlight unit "Ref" includes a glass light guide plate without an optic change part, while the backlight unit "Example" includes a glass light guide plate with an optical change part. The difference (Δ Wx and Δ Wy) of the color coordinate index between a light-incident side (LIS) of the light guide plate and an opposite side (OS) of the light guide plate and the difference (Δ uv) of the color sense between the light-incident side of the light guide plate and the opposite side of the light guide plate are listed in table 1.

TABLE 1

|  | Δ Wx | Δ Wy | Δ uv |
|---|---|---|---|
| Ref. | 0.016 | 0.028 | 0.025 |
| Example | 0 | 0.004 | 0.003 |

As shown in FIG. 5A and table 1, the difference (Δ Wx) of the white color coordinate index between a light-incident side of the light guide plate and an opposite side of the light guide plate is 0.016 in the backlight unit "Ref" and zero (0) in the backlight unit "Example".

As shown in FIG. 5B and table 1, the difference (Δ Wy) of the white color coordinate index between a light-incident side of the light guide plate and an opposite side of the light guide plate is 0.028 in the backlight unit "Ref" and 0.004 in the backlight unit "Example".

As shown in FIG. 5C and table 1, the difference (Δ uv) of the color sense between the light-incident side of the light guide plate and the opposite side of the light guide plate is 0.025 in the backlight unit "Ref" and 0.003 in the backlight unit "Example".

It is preferred that each of the difference (Δ Wy) of the white color coordinate index and the difference (Δ uv) of the color sense has a value below 0.004. Accordingly, as shown in FIGS. 5A to 5C and table 1, the backlight unit of the present invention, which includes a glass light guide plate with an optical change part, has advantages in the color purity and the color sense.

Figure 6:
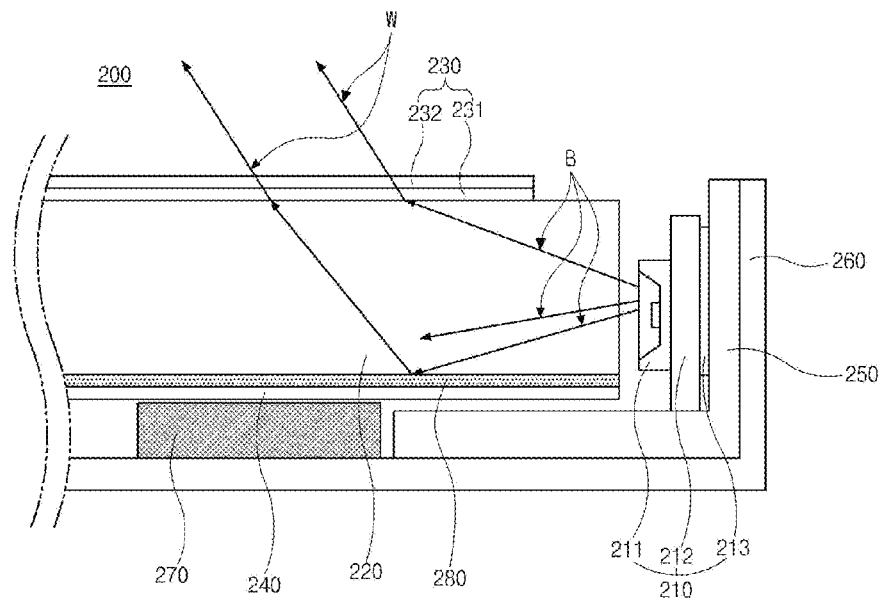
FIG. 6 is a schematic cross-sectional view of a backlight unit, according to one embodiment.

FIG. 6 is a schematic cross-sectional view of a backlight unit, according to another embodiment. The explanation is focused on a difference from the backlight unit in FIG. 2, and thus a description of similar components is omitted.

As shown in FIG. 6, the backlight unit 200 includes a light source 210, a light guide plate 220, an optical sheet 230, a reflective sheet 240, a housing 250, a bottom frame 260, a supporting part 270 and an optic change part 280.

The optic change part 280 is disposed under the light guide plate 220. Namely, the optic change part 280 is positioned between the light guide plate 220 and the reflective sheet 240.

The optic change part 280 may have various structures and may include various materials explained with references to FIGS. 3, 4A and 5B.

Figure 7:
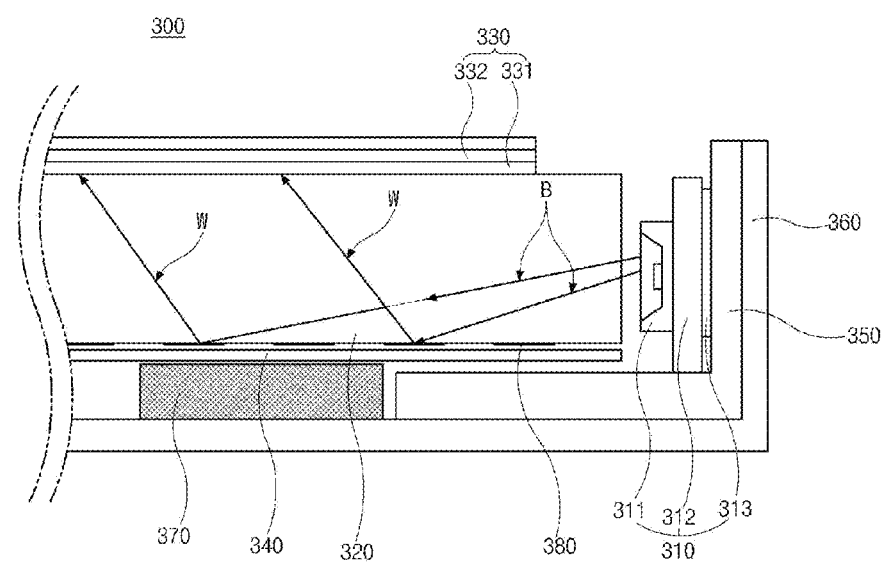
FIG. 7 is a schematic cross-sectional view of a backlight unit, according to one embodiment.
Figure 8:
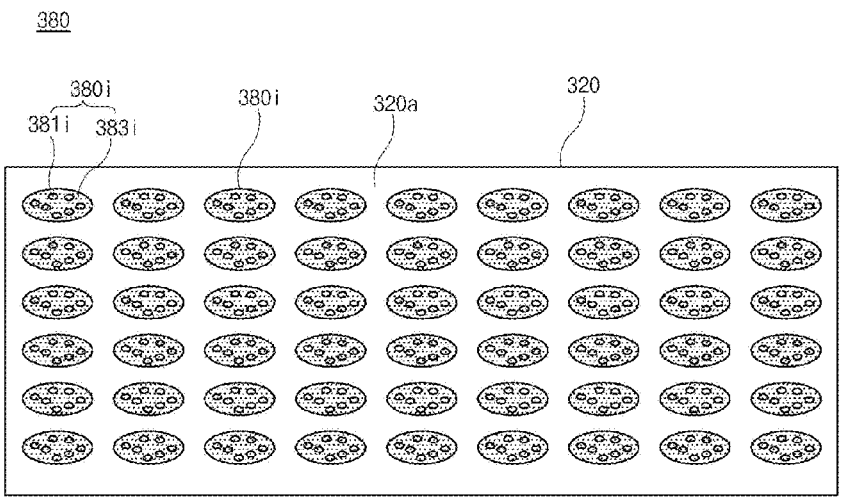
FIG. 8 is a plane view of a lower surface of the light guide plate in FIG. 7, according to one embodiment.

FIG. 7 is a schematic cross-sectional view of a backlight unit according to another embodiment, and FIG. 8 is a plane view of a lower surface of the light guide plate in FIG. 7. The explanation is focused on a difference from the backlight units in FIGS. 2 and 6.

As shown in FIG. 7, the backlight unit 300 includes a light source 310 providing a blue light B, a light guide plate 320, an optical sheet 330, a reflective sheet 340, a housing 350, a bottom frame 360, a supporting part 370 and an optic change part 380.

The light guide plate 320 is formed of a material having light transmittance above about 90%. The light guide plate 320 is formed of PMMA or glass, and beneficially glass having a relatively smaller expansion rate with respect to moisture or temperature.

The optic change part 380 is disposed on a lower surface of the light guide plate 320. The blue light B from the light source 310 is changed into a white light W by the optic change part 380. Alternatively, the backlight unit 300 may further include another optic change part on an upper surface of the light guide plate 320.

Referring to FIG. 8, the optic change part 380 includes a yellow fluorescent ink 380i. The yellow fluorescent ink 380i includes a yellow fluorescent material 381i in a transparent acryl resin 383i.

A size of the yellow fluorescent material 381i is determined considering transmittance and a haze value of the light guide plate 320 and compatibility with the transparent acryl resin 383i. For example, the yellow fluorescent material 381i may have a size less than about 10 micrometers.

Since the optic change part 380 is formed of an ink, the ink is coated on the light guide plate 320 to form the optic change part 380 using an ink jet apparatus.

In FIG. 6, the optic change part 280 has a layer shape. However, the optic change part 380 in FIG. 7 is formed on the light guide plate 320 as patterns.

When the blue light B from the blue LED array 111 is incident to the light guide plate 320 of glass, the blue light B is processed into a white light W by the yellow fluorescent ink 380i in the optic change part 380.

Figure 9:
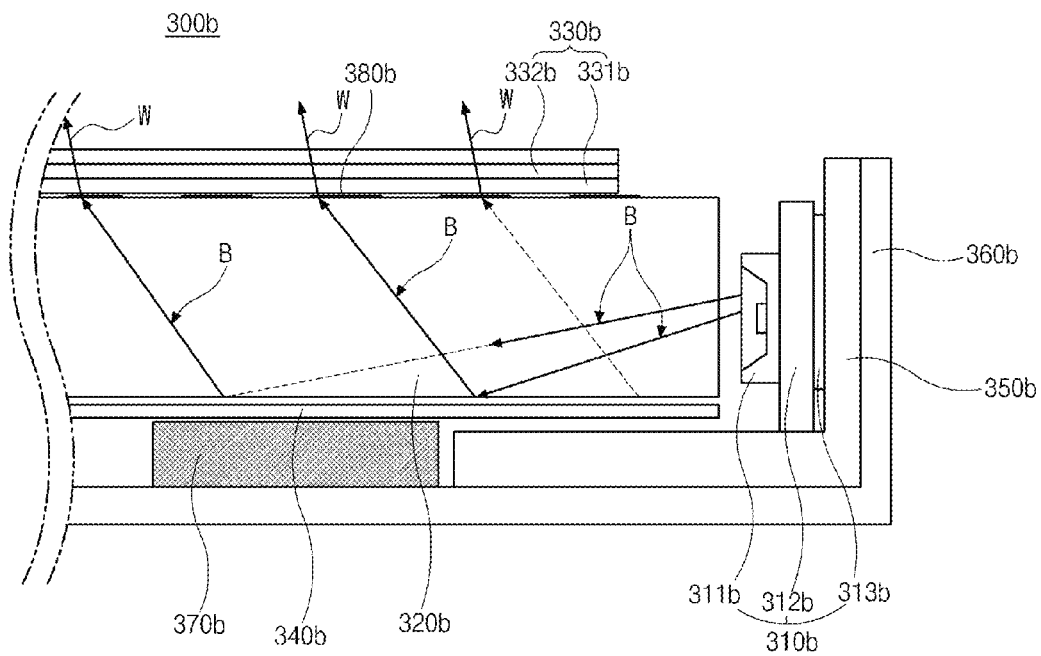
FIG. 9 is a schematic cross-sectional view of a backlight unit, according to one embodiment.

FIG. 9 is a schematic cross-sectional view of a backlight unit, according to another embodiment.

As shown in FIG. 9, the backlight unit 300b includes a light source 310b providing a blue light B, a light guide plate 320b, an optical sheet 330b, a reflective sheet 340b, a housing 350b, a bottom frame 360b, a supporting part 370b and an optic change part 380b.

The optic change part 380b is disposed on an upper surface of the light guide plate 320b. The blue light B from the light source 310b is changed into a white light W by the optic change part 380b. Alternatively, the backlight unit 300b may further include another optic change part on a lower surface of the light guide plate 320b.

The materials and the shapes of the optic change part 380b are similar to those explained with reference to FIGS. 7 and 8.

Figure 10:
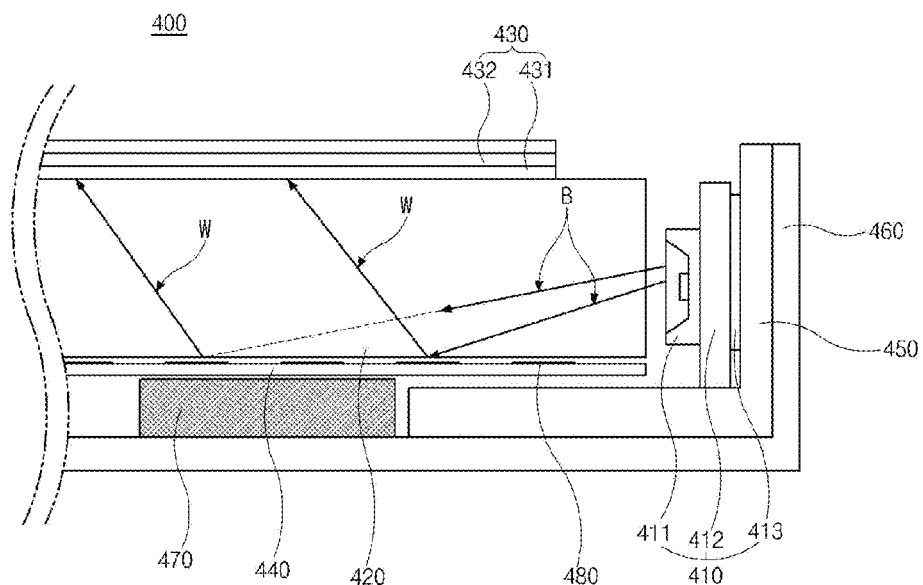
FIG. 10 is a schematic cross-sectional view of a backlight unit, according to one embodiment.

FIG. 10 is a schematic cross-sectional view of a backlight unit according to another embodiment.

As shown in FIG. 10, the backlight unit 400 includes a light source 410 providing a blue light B, a light guide plate 420, an optical sheet 430, a reflective sheet 440, a housing 450, a bottom frame 460, a supporting part 470 and an optic change part 480.

The optic change part 480 is disposed on an upper surface of the reflective sheet 440. The optic change part 480 includes a yellow fluorescent ink 380i (of FIG. 8). The yellow fluorescent ink 380i includes a yellow fluorescent material 381i (of FIG. 8) in a transparent acryl resin 383i (of FIG. 8).

The blue light B from the light source 410 is changed into a white light W by the optic change part 480. Namely, the leaked light from the light guide plate 420 is reflected by the reflective sheet 440, and the blue light B is changed into the white light W by the optic change part 480 on the reflective sheet 440.

Alternatively, the backlight unit 400 may further include another optic change part on a lower surface of the reflective sheet 440.

Figure 11:
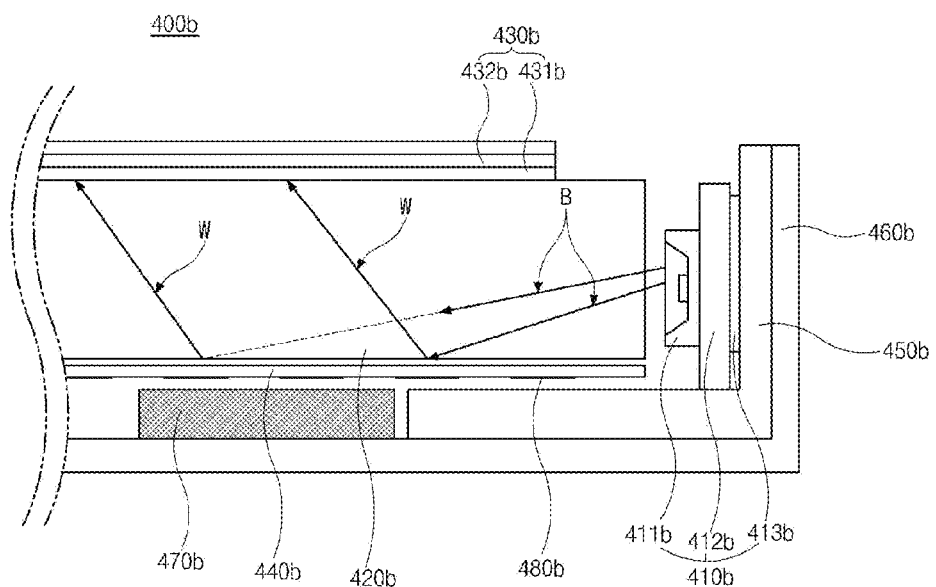
FIG. 11 is a schematic cross-sectional view of a backlight unit, according to one embodiment.

FIG. 11 is a schematic cross-sectional view of a backlight unit, according to another embodiment.

As shown in FIG. 11, the backlight unit 400b includes a light source 410b providing a blue light B, a light guide plate 420b, an optical sheet 430b, a reflective sheet 440b, a housing 450b, a bottom frame 460b, a supporting part 470b and an optic change part 480b.

The optic change part 480b is disposed on a lower surface of the reflective sheet 440b. In this instance, a protection sheet (not shown) may be attached onto the lower surface of the reflective sheet 440b to protect the optic change part 480b. Namely, the optic change part 480b is disposed between the reflective sheet 440b and the protection sheet.

The optic change part 480b includes a yellow fluorescent ink 380i (of FIG. 8). The yellow fluorescent ink 380i includes a yellow fluorescent material 381i (of FIG. 8) in a transparent acryl resin 383i (of FIG. 8).

The blue light B from the light source 410b is changed into a white light W by the optic change part 480b. Namely, the leaked light from the light guide plate 420b is reflected by the reflective sheet 440b, and the blue light B is changed into the white light W by the optic change part 480b on the reflective sheet 440b.

Alternatively, the backlight unit 400b may further include another optic change part on an upper surface of the reflective sheet 440b.

Figure 12:
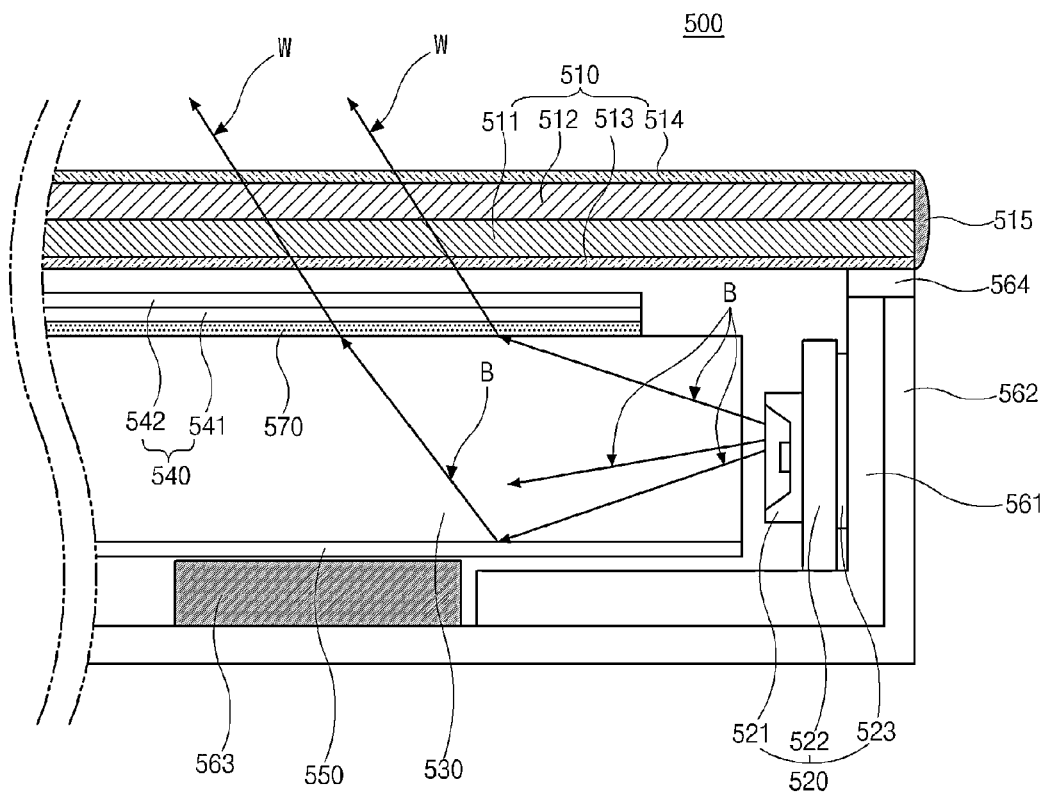
FIG. 12 is a schematic cross-sectional view of a display device, according to one embodiment.

FIG. 12 is a schematic cross-sectional view of a display device, according to one embodiment.

As shown in FIG. 12, the display device 500 includes a liquid crystal panel 510 and a backlight unit including a light source 520 providing a blue light B, a light guide plate 530, an optical sheet 540, a reflective sheet 550, a housing 561, a bottom frame 562 and an optic change part 570. The backlight unit is disposed under the liquid crystal panel 510 and provides a white light W onto the liquid crystal panel 510.

The liquid crystal panel 510 includes an array substrate 511, a color filter substrate 512 and a liquid crystal layer (not shown) therebetween.

A first polarization plate 513 for polarizing the light from the light source 520 of the backlight unit is attached to a lower side of the liquid crystal panel 510, and a second polarization plate 514 is attached to an upper side of the liquid crystal panel 510.

In addition, a sealing part 515 for preventing damages on the liquid crystal panel 510 by an outer impact and preventing light leakage is formed at side surfaces of the liquid crystal panel 510.

The light from the light source 520 passes through the liquid crystal layer such that the liquid crystal panel 510 displays images.

The light source 520 includes a blue LED array 521, a PCB 522 and a heat-radiating part 523.

In more detail, the blue LED array 521 emitting the blue light B is arranged on a first surface of the PCB 522 of a flexible material. The blue LED array 521 receives a power from an outer part through the PCB 522.

The heat-radiating part 523 is coupled to a second surface of the PCB 522. The heat from the blue LED array 521 is radiated into an outer space by the heat-radiating part 523. Since the heat from the blue LED array 521 is radiated into the housing 561, increase of a temperature in the backlight unit can be prevented. As a result, thermal deformation of the light guide plate 530 by the heat from the blue LED array 521 is also prevented.

The light guide plate 530 is disposed at a side of the light source 520, and the light B from the blue LED array 521 is provided through an upper surface of the light guide plate 530. In other words, the light source 520 is positioned at a side of the light guide plate 530.

The light guide plate 530 is formed of a material having light transmittance above about 90%. The light guide plate 530 is formed of PMMA or glass, and beneficially glass.

The optical sheet 540 is disposed over the upper surface of the light guide plate 530. The light is diffused and concentrated by the optical sheet 540. For example, the optical sheet 540 includes a light-diffusion sheet 541 and a light-concentration sheet 542.

The optic change part 570 has substantially the same shape, the same position and the same material as the optic change part 180 in FIGS. 3, 4A and 4B.

After the blue light B from the blue LED array 521 passes through the light guide plate 530 of glass, the blue light B is incident onto the optic change part 570 to be a white light W by the yellow fluorescent material in the optic change part 570.

The light-diffusion sheet 541 diffuses the white light W from the optic change part 570 and controls a direction of the white light W into the light-concentration sheet 542.

The light-concentration sheet 542 may include a prism pattern (not shown), and the white light W through the light-diffusion sheet 541 is concentrated into the liquid crystal panel 510 by the light-concentration sheet 542.

In FIG. 12, the light-concentration sheet 542 is disposed on the light-diffusion sheet 541. Alternatively, the light-diffusion sheet 541 may be disposed on the light-concentration sheet 542.

In FIG. 12, the optic change part 570 is disposed between the optical sheet 540 and the light guide plate 530. Alternatively, the optical change part 570 may be disposed on the optical sheet 540 or between the light-diffusion sheet 541 and the light-concentration sheet 542.

The reflective sheet 440 reflects the blue light B leaked from the light guide plate 430 toward the liquid crystal panel 510.

The housing 561 includes a relatively high thermal conductivity material. For example, the housing 561 may include aluminum (Al).

The housing 561 includes an inner side surface, where the light source 520 is attached, and a horizontal bottom surface, which is vertically bent from the side surface, under the reflective sheet 550.

The bottom frame 562 includes side surfaces and a horizontal bottom surface to provide a space for the light source 520, the light guide plate 530, the optical sheet 540, the reflective sheet 550 and the optic change part 570.

Since the bottom frame 562 is attached to the side surface of the housing 561, the heat from the blue LED array 521 is radiated into an outer space through the heat-radiation part 523, the housing 561 and the bottom frame 562.

The display device 500 may further include a supporting part 563. The supporting part 563 is positioned between the horizontal bottom surface of the bottom frame 562 and the reflective sheet 550 to support the reflective sheet 550 and the light guide plate 530.

Since the light guide plate 530 is formed of glass and the reflective sheet 550 is formed of polycarbonate-based material, the supporting part 563 is formed of an elastic material, e.g., silicon, rubber, polyethylene terephthalate (PET) or polycarbonate.

Figure 13:
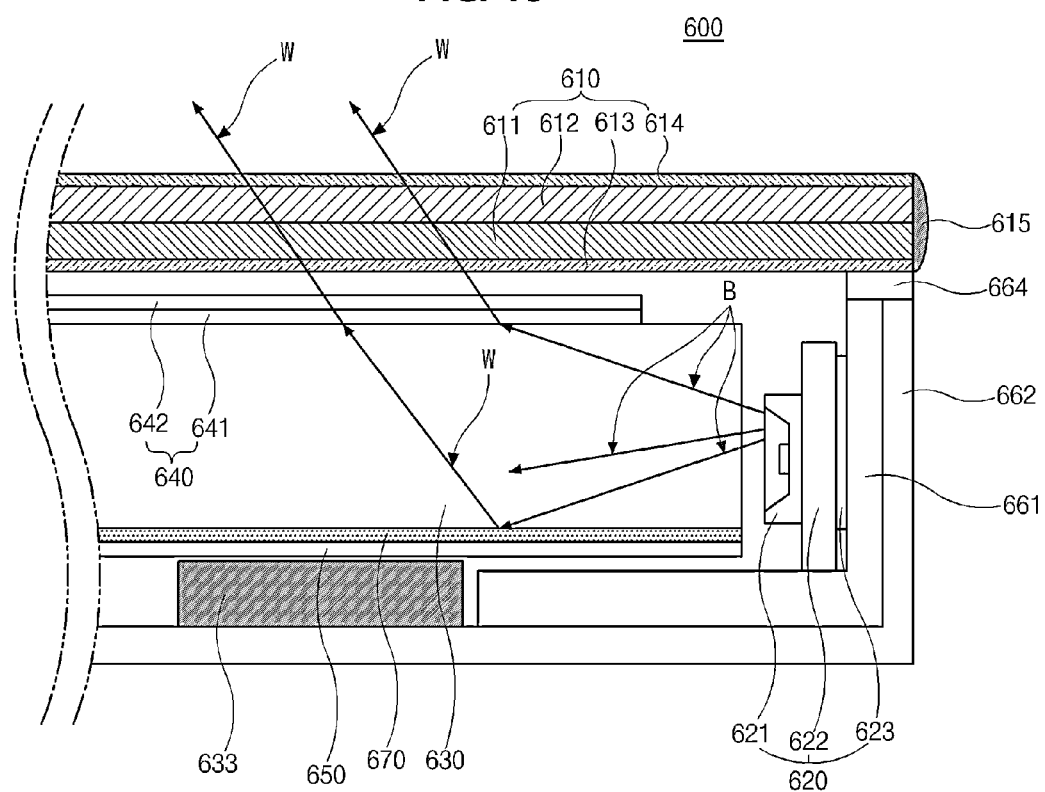
FIG. 13 is a schematic cross-sectional view of a display device, according to one embodiment.

FIG. 13 is a schematic cross-sectional view of a display device, according to another embodiment.

As shown in FIG. 13, the display device 600 includes a liquid crystal panel 610 and a backlight unit including a light source 620 providing a blue light B, a light guide plate 630, an optical sheet 640, a reflective sheet 650, a housing 661, a bottom frame 662 and an optic change part 670. The backlight unit is disposed under the liquid crystal panel 610 and provides a white light W onto the liquid crystal panel 610.

The optic change part 670 is disposed under the light guide plate 630. Namely, the optical change part 670 is positioned between the light guide plate 630 and the reflective sheet 650.

The shape or structure and the material of the optic change part 670 are modified as explained above.

Figure 14:
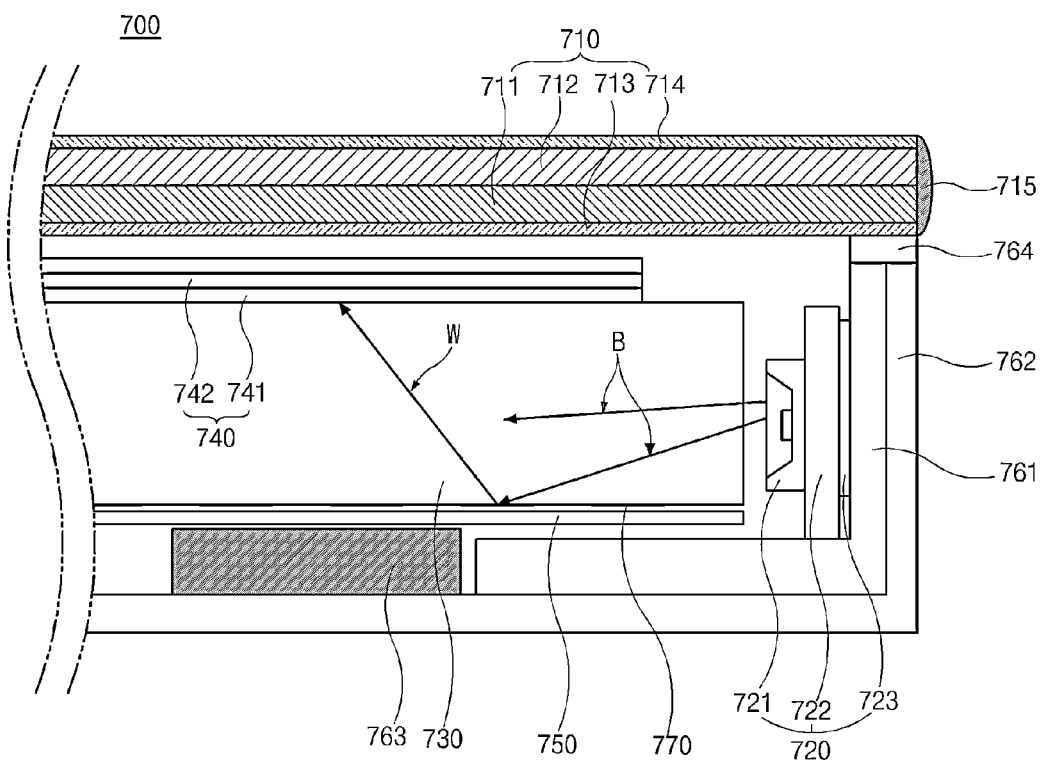
FIG. 14 is a schematic cross-sectional view of a display device, according to one embodiment.

FIG. 14 is a schematic cross-sectional view of a display device, according to another embodiment.

As shown in FIG. 14, the display device 700 includes a liquid crystal panel 710 and a backlight unit including a light source 720 providing a blue light B, a light guide plate 730, an optical sheet 740, a reflective sheet 750, a housing 761, a bottom frame 762 and an optic change part 770. The backlight unit is disposed under the liquid crystal panel 710 and provides a white light W onto the liquid crystal panel 710.

The light guide plate 730 is formed of a material having light transmittance above about 90%. The light guide plate 7300 is formed of PMMA or glass, and beneficially glass.

The optic change part 770 is disposed on a lower surface of the light guide plate 730. The blue light B from the light source 720 is changed into a white light W by the optic change part 770. Alternatively, the backlight unit may further include another optic change part on an upper surface of the light guide plate 730.

As explained with reference to FIGS. 7 and 8, the optic change part 770 includes a yellow fluorescent ink 380$i$ as the optic change part 380. The yellow fluorescent ink 380$i$ includes a yellow fluorescent material 381$i$ in a transparent acryl resin 383$i$.

A size of the yellow fluorescent material 381$i$ is determined considering transmittance and a haze value of the light guide plate 730 and compatibility with the transparent acryl resin 383$i$. For example, the yellow fluorescent material 381$i$ may have a size less than about 10 micrometers.

Since the optic change part 770 is formed of an ink, the ink is coated on the light guide plate 730 to form the optic change part 770 using an ink jet apparatus.

When the blue light B from the blue LED array 721 is incident to the light guide plate 730 of glass, the blue light B is processed into a white light W by the yellow fluorescent ink 380$i$ in the optic change part 770.

Figure 15:
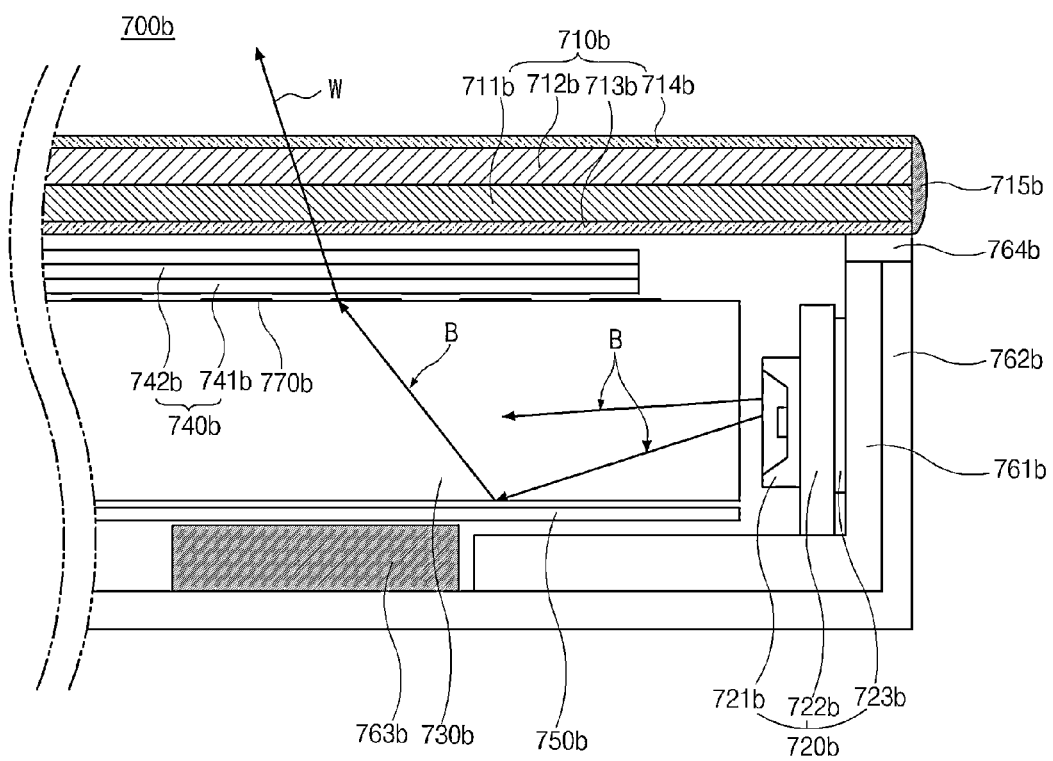
FIG. 15 is a schematic cross-sectional view of a display device, according to one embodiment.

FIG. 15 is a schematic cross-sectional view of a display device, according to another embodiment.

As shown in FIG. 15, the display device 700$b$ includes a liquid crystal panel 710$b$ and a backlight unit including a light source 720$b$ providing a blue light B, a light guide plate 730$b$, an optical sheet 740$b$, a reflective sheet 750$b$, a housing 761$b$, a bottom frame 762$b$ and an optic change part 770$b$. The backlight unit is disposed under the liquid crystal panel 710$b$ and provides a white light W onto the liquid crystal panel 710$b$.

The optic change part 770$b$ is disposed on an upper surface of the light guide plate 730$b$. The blue light B from the light source 720$b$ is changed into a white light W by the optic change part 770$b$. Alternatively, the backlight unit may further include another optic change part on a lower surface of the light guide plate 730$b$.

When the blue light B from the light source 720$b$ is incident to the light guide plate 730$b$, the blue light B is processed into a white light W by the optic change part 770$b$.

The materials and the shapes of the optic change part 770$b$ are similar to those explained with reference to FIGS. 7 and 8.

Figure 16:
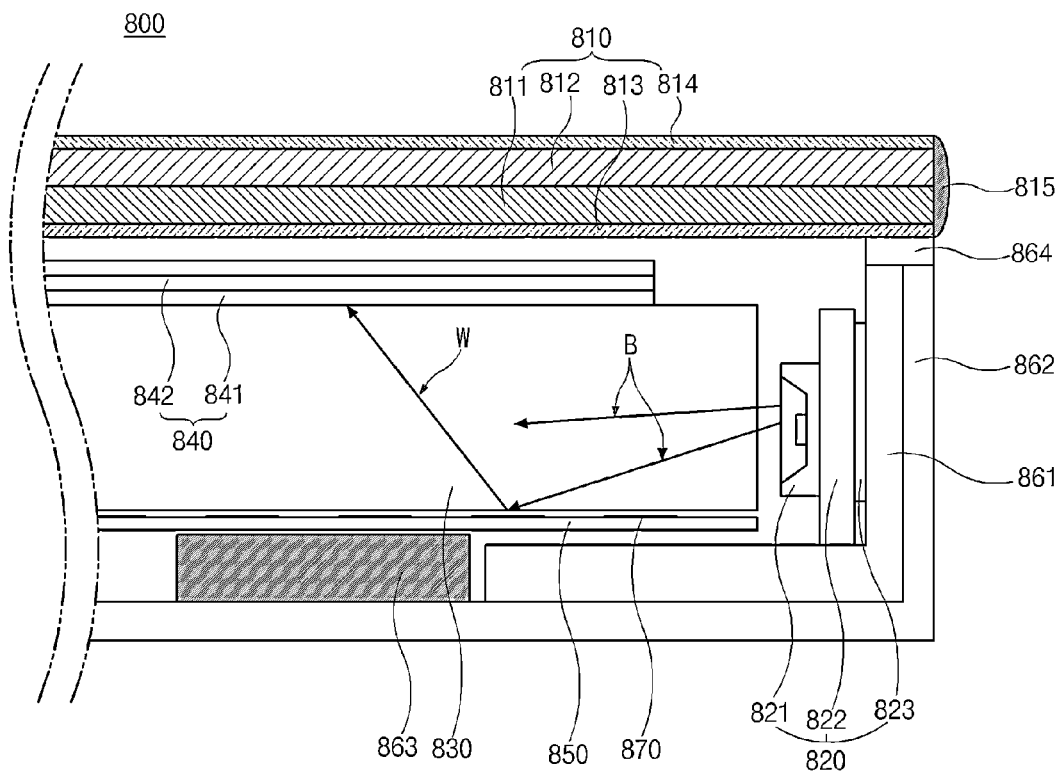
FIG. 16 is a schematic cross-sectional view of a display device, according to one embodiment.

FIG. 16 is a schematic cross-sectional view of a display device, according to another embodiment.

As shown in FIG. 16, the display device 800 includes a liquid crystal panel 810 and a backlight unit including a light source 820 providing a blue light B, a light guide plate 830, an optical sheet 840, a reflective sheet 850, a housing 861, a bottom frame 862 and an optic change part 870. The backlight unit is disposed under the liquid crystal panel 810 and provides a white light W onto the liquid crystal panel 810.

The optic change part 870 is disposed on an upper surface of the reflective sheet 850. Alternatively, the backlight unit may further include another optic change part on a lower surface of the reflective sheet 850.

The optic change part 870 includes a yellow fluorescent ink 380$i$ (of FIG. 8). The yellow fluorescent ink 380$i$ includes a yellow fluorescent material 381$i$ (of FIG. 8) in a transparent acryl resin 383$i$ (of FIG. 8).

The blue light B from the light source 820 is changed into a white light W by the optic change part 870. Namely, the leaked light from the light guide plate 830 is reflected by the reflective sheet 850, and the blue light B is changed into the white light W by the optic change part 870 on the reflective sheet 850.

Figure 17:
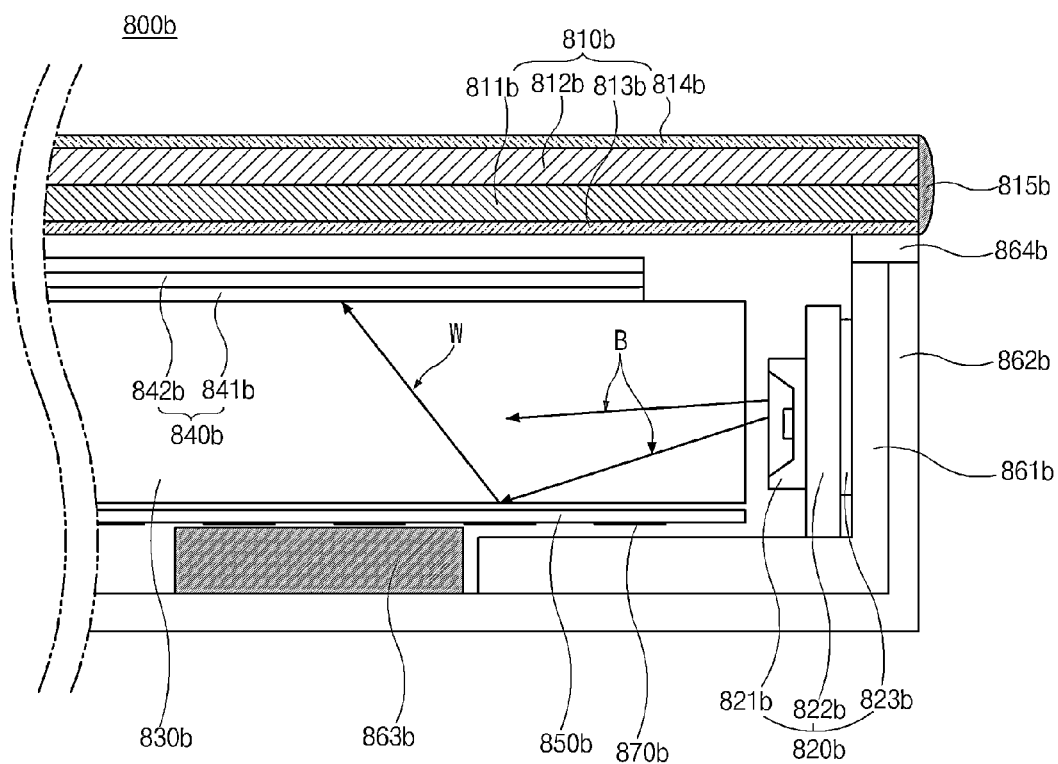
FIG. 17 is a schematic cross-sectional view of a display device, according to one embodiment.

FIG. 17 is a schematic cross-sectional view of a display device, according to another embodiment.

As shown in FIG. 17, the display device 800$b$ includes a liquid crystal panel 810$b$ and a backlight unit including a light source 820$b$ providing a blue light B, a light guide plate 830$b$, an optical sheet 840$b$, a reflective sheet 850$b$, a housing 861$b$, a bottom frame 862$b$ and an optic change part 870$b$. The backlight unit is disposed under the liquid crystal panel 810$b$ and provides a white light W onto the liquid crystal panel 810$b$.

The optic change part 870$b$ is disposed on a lower surface of the reflective sheet 850$b$. In this instance, a protection sheet (not shown) may be attached onto the lower surface of the reflective sheet 850$b$ to protect the optic change part 870$b$. Namely, the optic change part 870$b$ is disposed between the reflective sheet 850$b$ and the protection sheet.

The optic change part 870$b$ includes a yellow fluorescent ink 380$i$ (of FIG. 8). The yellow fluorescent ink 380$i$ includes a yellow fluorescent material 381$i$ (of FIG. 8) in a transparent acryl resin 383$i$ (of FIG. 8).

The blue light B from the light source 820$b$ is changed into a white light W by the optic change part 870$b$. Namely, the leaked light from the light guide plate 830$b$ is reflected by the reflective sheet 850$b$, and the blue light B is changed into the white light W by the optic change part 870$b$ on the reflective sheet 850$b$.

Alternatively, the backlight unit may further include another optic change part on an upper surface of the reflective sheet 850$b$.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit, comprising:
a light source providing a blue light;
a light guide plate of glass at a side of the light source;
an optical sheet on the light guide plate;
a reflective sheet under the light guide plate;
an optic change part including a yellow fluorescent material and disposed on a lower surface of the light guide plate;
a bottom frame providing a space for the light source, the light guide plate, the optical sheet and the reflective sheet;
a housing inside the bottom frame, the housing comprising an inner side surface supporting the light source and a horizontal bottom portion under the reflective sheet; and
a supporting part between the bottom frame and the reflective sheet, the supporting part supporting the light guide plate and the reflective sheet to maintain a gap between the reflective sheet and the bottom frame,
wherein the supporting part is not in contact with the housing, wherein the blue light is changed into a white light by the optic change part, and wherein the supporting part and the light guide plate overlap each other in a plane view.

2. The backlight unit according to claim 1, wherein the light source includes:
a printed circuit board;
a blue light emitting diode array arranged on a first surface of the printed circuit board; and
a heat-radiating part on a second surface of the printed circuit board.

3. The backlight unit according to claim 1, wherein the optic change part includes a yellow fluorescent ink including a yellow fluorescent material in a transparent acryl resin.

4. The backlight unit according to claim 1, wherein the supporting part is thicker than the horizontal bottom portion.

5. A display device, comprising:
a liquid crystal panel; and
a backlight unit disposed under the liquid crystal panel and providing a light to the liquid crystal panel, the backlight unit including:
a light source providing a blue light;
a light guide plate of glass at a side of the light source;
an optical sheet on the light guide plate;
a reflective sheet under the light guide plate; and
an optic change part including dots of a yellow fluorescent ink disposed in a grid pattern on a lower surface of the light guide plate, the yellow fluorescent ink comprising particles of a yellow fluorescent material less than 10 micrometers in size dispersed in a transparent acryl resin;
a bottom frame providing a space for the light source, the light guide plate, the optical sheet, and the reflective sheet;
a supporting part between the bottom frame and the reflective sheet, the supporting part supporting the light guide plate and the reflective sheet to maintain a gap between the reflective sheet and the bottom frame; and
a housing on an inner side of which the light source is attached,
wherein the blue light is changed into a white light by the optical change part, and wherein the supporting part is disposed to be spaced apart from the housing, and wherein the supporting part and the light guide plate overlap each other in a plane view.

6. The display device according to claim 5, wherein the light source includes:
a printed circuit board;
a blue light emitting diode array arranged on a first surface of the printed circuit board; and
a heat-radiating part on a second surface of the printed circuit board.

* * * * *